J. R. McCONNELL.
Sulky Plow.
No. 82,140.            Patented Sept. 15, 1868.
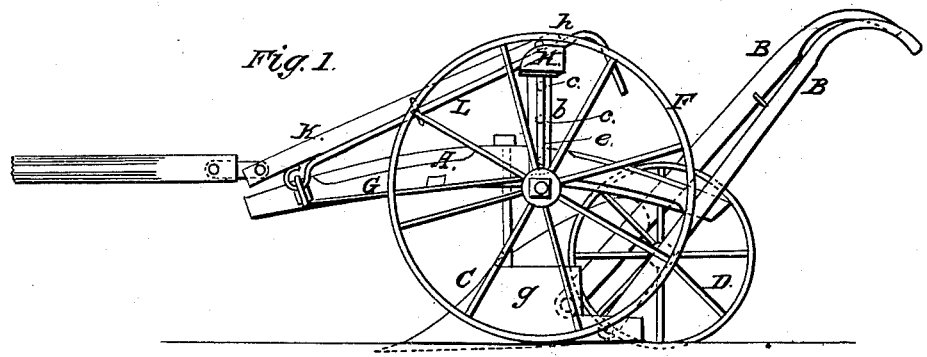
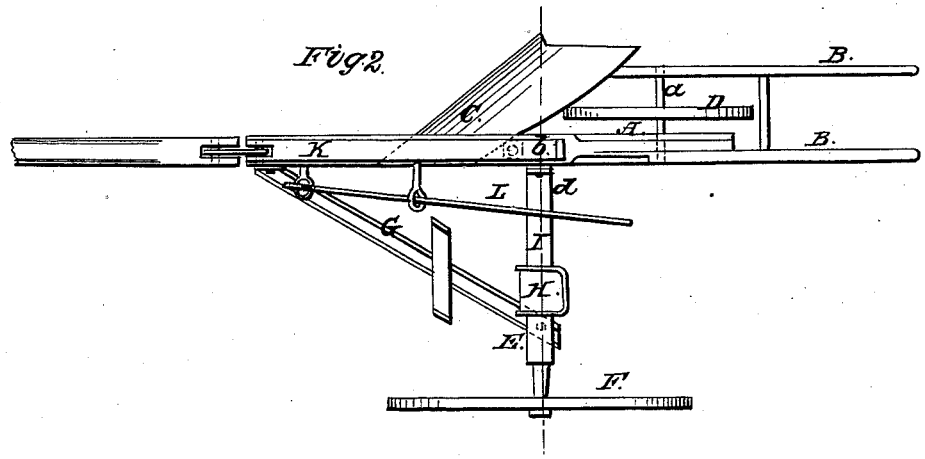
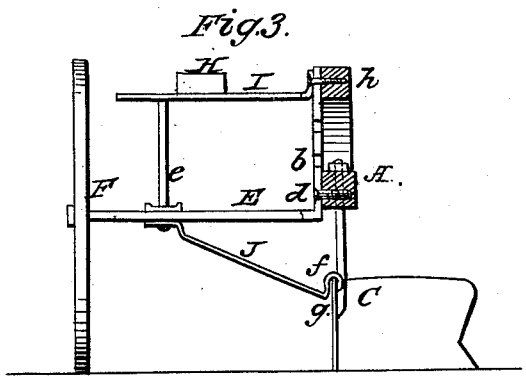
Witnesses.
Inventor:
J. R. McConnell
per Munn & Co
Attorneys

United States Patent Office.

J. R. McCONNELL, OF MARENGO, IOWA.

Letters Patent No. 82,140, dated September 15, 1868.

---

IMPROVEMENT IN SULKY-PLOW.

---

The Schedule referred to in these Letters Patent and making part of the same.

---

TO ALL WHOM IT MAY CONCERN:

Be it known that I, J. R. McCONNELL, of Marengo, in the county of Iowa, and State of Iowa, have invented a new and improved Sulky-Plow; and I do hereby declare that the following is a full, clear, and exact description thereof, which will enable those skilled in the art to make and use the same, reference being had to the accompanying drawings, forming part of this specification.

This invention relates to a new and improved sulky-plow, and it consists in a peculiar construction of the same, as hereinafter fully shown and described, whereby ease of draught, uniformity in the depth of furrow, and complete control over the machine by the driver, is obtained.

In the accompanying sheet of drawings—

Figure 1 is a side view of my invention.

Figure 2, a plan or top view of the same.

Figure 3, a transverse vertical section of the same, taken in the line $x\,x$, fig. 1.

Similar letters of reference indicate corresponding parts.

A represents a plow-beam, and

B B, handles attached thereto.

C, the plow attached to the beam as usual, and

D, a wheel, the axle $a$ of which is secured between the handles.

E represents a bar, one end, $b$, of which is turned upward, at right angles with the main part, is perforated with a series of holes, $c$, and is attached to the land-side of the beam by a bolt, $d$.

The bar E projects at right angles from the land-side of the beam A, and is supported at its outer end by a wheel, F, which may be of any required diameter, the bar E being adjusted higher or lower to the beam A, to suit the diameter of said wheel.

The bar E is braced from the front part of the beam A, by a bar, G, shown clearly in fig. 2.

H is the driver's seat, secured upon a bar, I, one end of which is attached to the upper end of the bent part of the bar E, and the other end supported by an upright, $e$, from bar E.

To the under side of the bar E there is attached at one end a bar, J, and this bar at its opposite end is bent in hook-form, as shown at $f$, and is fitted over the top of the land-side $g$ of the plow.

The bar J may be made adjustable, if desired, so that its outer end may be secured to E at different points, nearer to or further from the outer end of E, so that more or less land may be given the plow C.

K is the draught-pole, which is attached, by a pivot-bolt, $h$, to the upper end of the bent part of the bar E.

The draught-pole has a lever, L, connected to it, said lever being attached to the front end of the beam A.

The team is attached to the front end of the beam A, the draught-pole being fitted in the neck-yoke at the front of the team.

The plow may be raised out of the ground at any time by depressing the rear end of the lever L.

The plow, by this arrangement of parts, as shown and described, will make a furrow of uniform depth, may be raised out of the ground whenever desired, may have more or less land given it, as required, readily adapted for plowing furrows of different depths, and will require but a moderate draught-power.

I claim as new, and desire to secure by Letters Patent—

1. The construction and arrangement of the pivoted draught-pole K, adjustable side bar E, beam A, and lever L, as herein described for the purpose specified.

2. The adjustable right-angular bar E, seat-bar I, adjustable bar J, brace G, and lever L, in combination with the beam A, pivoted draught-pole K, and plow C, all arranged as described, for the purpose specified.

3. The adjustable right-angular bar E, adapted to support the seat and bar H I, the bar J, brace G, and pivoted draught-pole K, as herein described for the purpose specified.

J. R. McCONNELL.

Witnesses:
 JOSEPH DUNHAM,
 JOHN MILLER.